Sept. 14, 1965　　　A. E. RELATION ETAL　　　3,206,646
MEANS FOR HOUSING CIRCUIT ARRANGEMENTS
Filed Aug. 17, 1959　　　　　　　　　　　　　　3 Sheets-Sheet 1

WITNESSES
Edwin E. Bassler
Edward F. Possessky

INVENTORS
Alfred E. Relation &
John F. Roesel, Jr.
BY Donald Smith
ATTORNEY

United States Patent Office 3,206,646
Patented Sept. 14, 1965

1

3,206,646
MEANS FOR HOUSING CIRCUIT
ARRANGEMENTS
Alfred E. Relation, Plum Township, Allegheny County, and John F. Roesel, Jr., Pittsburgh, Pa., assignors to Westinghouse Electric Corporation, East Pittsburgh, Pa., a corporation of Pennsylvania
Filed Aug. 17, 1959, Ser. No. 834,216
6 Claims. (Cl. 317—100)

The present invention relates to electrical systems for supplying energy to load apparatus and more particularly to housing devices for such systems.

When an electrical system is placed in use, particularly if the use is associated with a commercial product, means for housing the system is ordinarily required in order to provide a finished appearance for the system and, in many instances, to meet whatever Underwriters' specifications may be required for safety purposes. The housing means must, of course, be accorded a physical embodiment consistent with related technological and economic factors. Thus, in providing a housing for an electrical system, it is necessary that a combination of physical principles be creatively applied to the construction of the housing in a manner consistent with the technological and economic factors just mentioned.

To exemplify the general considerations just set forth, it is obvious, of course, that a housing for an electrical system or circuit arrangement necessarily provides for physical support of each of the elements of the arrangement. The latter function is in addition to the aforementioned requirement of providing a finished appearance and in addition to another requirement of minimizing the size of the housing.

Just as important to the conception of an arrangement for a housing as the factors so far considered, are thermal and other technological factors. With respect to the thermal factor, it is necessary that the elements of the housed circuit arrangement be maintained below prescribed upper temperature limits through a provision of suitable heat transfer from the elements.

Summarily, it is necessary that a housing be economically constructed and, additionally, be functional to provide whatever requirements are necessary for successful and reliable operation of the circuit arrangement it contains. It is in the perspective of the remarks thus far made that the present invention will be better understood.

Thus, it is an object of the invention to provide a novel and efficient housing having an economic construction and having means for enabling proper operation of a circuit arrangement supported by the housing.

It is another object of the invention to provide a housing of the character described and having means for dissipating heat generated during operation of a circuit arrangement supported by the housing.

It is a further object of the invention to provide such a housing having electrically isolated means for dissipating heat generated during operation of a circuit arrangement supported by the housing.

Another object of the invention is to provide a housing having a heat conduction path terminating in radiating fins for dissipation of heat generated during operation of a circuit arrangement supported by the housing, with the heat conduction path being electrically discontinuous so that the desired electrical operation of the circuit arrangement can be maintained.

These and other objects of the invention will become more apparent upon consideration of the following detailed description along with the attached drawings, in which:

FIG. 1 is a perspective view of a housing constructed in accordance with the principles of the invention.

2

Figure 1:
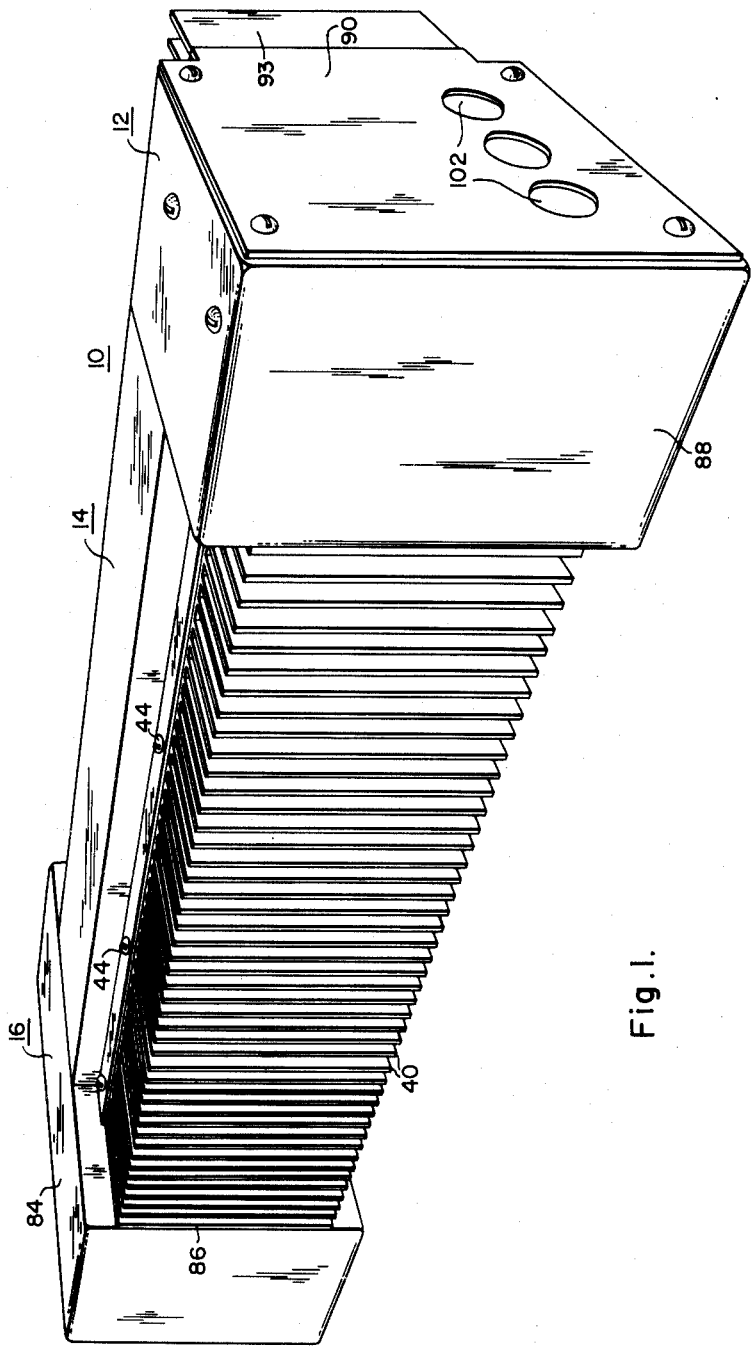

Consistent with the remarks previously set forth, the invention generally provides for embodying a housing to support the circuit elements of a circuit arrangement and to provide for dissipation of generated heat without interference with the electrical operation of the circuit arrangement. The operation of the circuit arrangement which is shown in part in the drawings, for illustrative purposes only, will not be explained here and, accordingly, reference is made to a copending application of J. F. Roesel, Jr., and A. E. Relation, entitled Electrical System for Energizing Load Apparatus, filed August 17, 1959, Serial No. 834,306, and assigned to the present assignee, now U.S. Patent 2,983,846, for a description of the operation of this circuit arrangement.

With reference to FIGURE 1, certain elements forming a part of the circuit arrangement just mentioned are supported in a housing 10. It is to be noted generally that the circuit arrangement being considered here is used in part to convert an alternating current from one frequency to a second frequency and, accordingly, can be generally divided into a rectifier section, an inverter section, and a load section. The elements of the rectifier section of the circuit arrangement are supported in an end portion 12 of the housing 10, and the elements of the inverter section and certain elements of the load section are supported in a central portion 14 and another end portion 16 of the housing 10. It is to be emphasized that the circuit arrangement that is housed in the embodiment of the invention being described here is only exemplary of a variety of circuit arrangements that can be housed in accordance with the principles of the invention.

Figure 2:
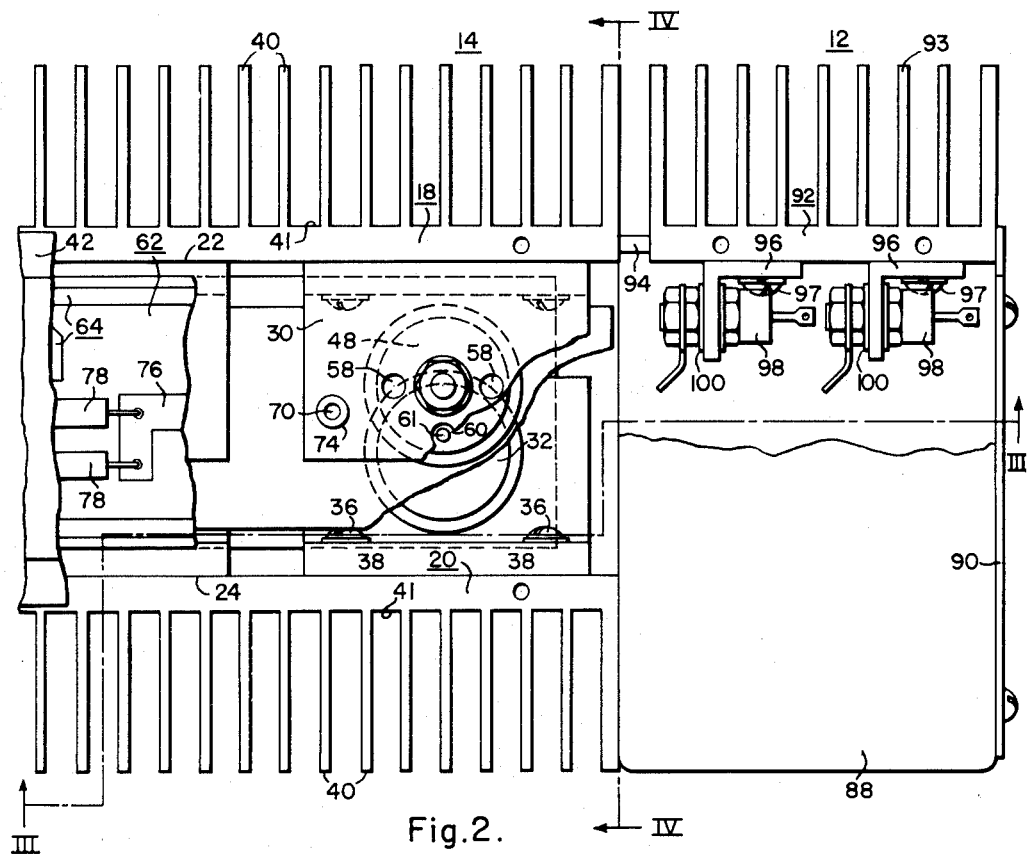
FIG. 2 is a partial top plan view, with portions broken away, of the housing shown in FIG. 1.

The central portion 14 of the housing 10 is generally constructed to provide support and heat dissipation for certain circuit elements to be referred to subsequently. Accordingly, as viewed in FIGS. 2 and 4, a pair of elongated wall members 18, 20 are provided to form spaced inner sides 22, 24 for the central portion 14 of the housing 10. Engaged with each of the inner sides 22, 24 is a series, five in number here, of longitudinally spaced brackets 26, each of which is formed by a pair of arms 28, 30 as clearly depicted in FIG. 4. The brackets 26 provide means for supporting heat generating circuit elements, in this instance transistors 32.

Figure 3:
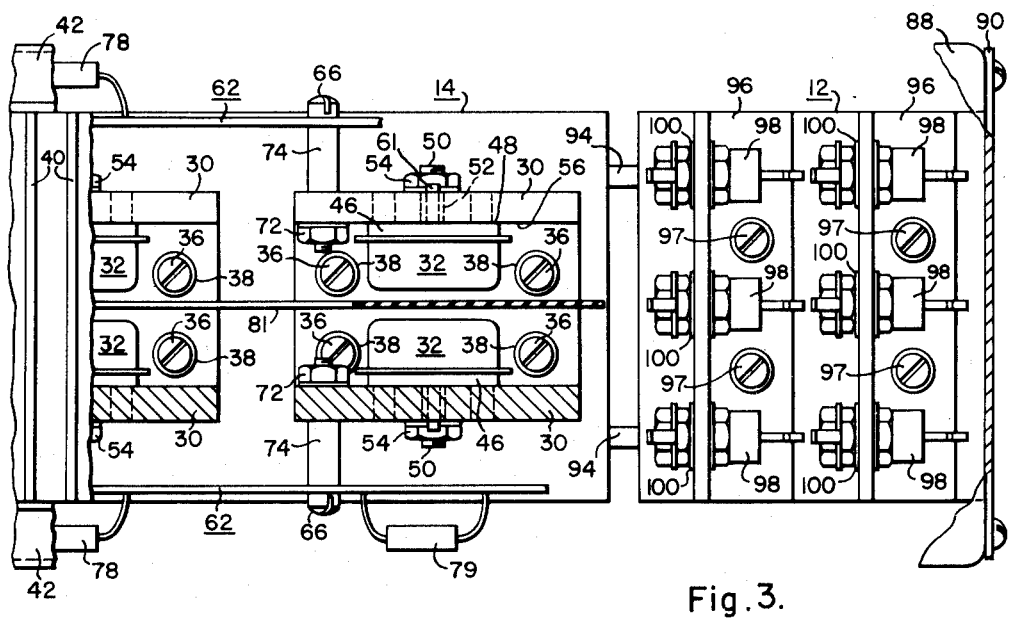
FIG. 3 is a partial elevational view, with portions broken away, of the housing shown in FIG. 1 taken along the reference line III—III of FIG. 2.
Figure 4:
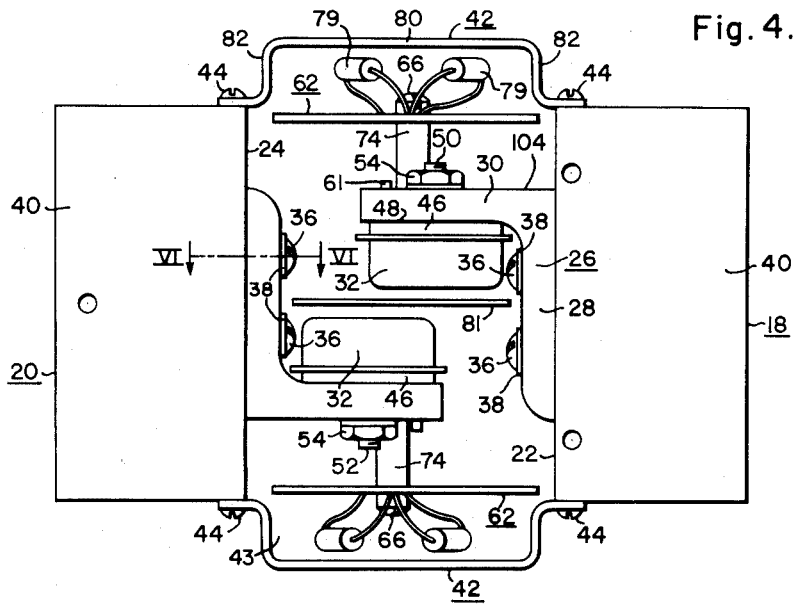
FIG. 4 is an end view of the housing shown in FIG. 1 taken along the reference line IV—IV of FIG. 2.
Figure 6:
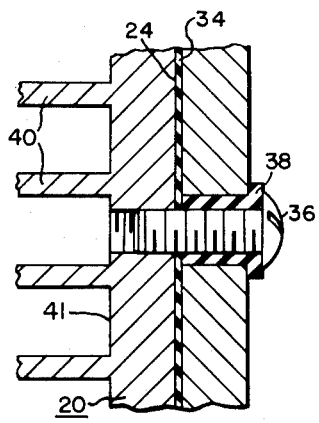
FIG. 6 is a sectional view, in part, of the reference housing of FIG. 1 along the line VI—VI of FIG. 4.

A member or film 34 of insulation is engaged with the inner side 22 or 24 of the wall members 18 or 20, as viewed in FIG. 6, so that the brackets 26 are electrically isolated from the wall members 18, 20 when engaged therewith. As illustrated in FIGS. 3 and 4, each of the brackets 26 is engaged with its associated wall member 18 or 20 with the use, for example, of a plurality of bolts 36 that are engaged with the wall members 18, 20 through threaded openings to position firmly the brackets 26 relative to the wall members 18, 20. Of course, as viewed in FIG. 6, an insulator 38 is used to isolate electrically each of the bolts 36 from the brackets arms 28. The film 34 of insulation, being, for example, in the form of a polyester film, a mica sheet, or a polytetrafluoroethylene film, is provided with a thickness that ensures electrical isolation of the brackets 26 from the wall members 18, 20 but which only nominally impedes heat flow from the brackets 26 to the wall members 18, 20. It has been found, for example, that a thickness of about .002 of an inch is satisfactory for the operational purposes just considered.

In order to facilitate a transfer of heat from each of the brackets 26 to the wall members 18, 20 and therefore to provide what is known as a heat sink for dissipation of the heat, a plurality of radiating fins 40 are extended outwardly from an outer side 41 of each of the wall members 18, 20. Heat transferred to each of the wall members 18, 20 is, therefore, readily transferred to any ambient matter, such as air, through radiation or other forms of heat transfer. It is to be noted that the wall members 18, 20 can be formed by any suitable process of manufacture, but it is preferable to form the wall members 18, 20 integrally by extrusion for economy purposes.

The material used to form the wall members 18, 20 can be any one having suitable thermal and structural properties. As an example, aluminum has been found to be characterized with properties suitable for use in the embodiment of the invention shown here. If the use of aluminum for the housing is desired, the aluminum can be anodized to provide a finished appearance for the housing 10 in any desired color.

The wall members 18, 20 are maintained in a prescribed position with respect to one another through the use of a pair of elongated closure members 42 as clearly shown in FIGURE 4. The closure members 42 are engaged with the lateral edges of the oppositely positioned wall members 18, 20 through the use, for example, of suitably spaced bolts 44. Of course, before engaging the closure members 42 with the wall members 18, 20 it is necessary that the circuit elements to be supported within the space between the wall members 18, 20 be finally positioned so that, when the closure members 42 are engaged with the wall members 18, 20, the central portion 14 of the housing 10 will be closed except for end openings 43, of which one is clearly shown in FIG. 4, for providing for passage of conductors between the central portion 14 of the housing 10 and the end portions 12, 16 of the housing 10, respectively.

To continue with the description of the central portion 14 of the housing 10 with particular reference to FIGURES 3 and 4, a transistor 32, in this example, is engaged with the inwardly extended arm 30 of each of the brackets 26. A mounting portion 46 of the transistor 32 is formed from a conductive material, such as a copper alloy, and is provided with a generally flat, outwardly facing surface 48.

Additionally, extended transversely outwardly from the flat surface 48 of the transistor 32 is a threaded stud 50 which, when passed through an opening 52 in the arm 30 of the bracket 26 and engaged with a nut 54, provides for a firm and flush engagement of the mounting portion 46 of the transistor 32 with an inwardly facing surface 56 of the bracket arm 30. The surface 48 of the transistor mounting portion 46 and the inner surface 56 of the bracket arm 30 are maintained flush relative to one another so that heat is optimally transferred from the transistor 32 to the bracket 26 and, additionally, so that an electrically conductive path is provided between the mounting portion 46 of the transistor 32 and the bracket 26. A pair of spaced openings 58 are also provided in the bracket arm 30 for passage of a pair of conductors or leads (not shown) that extend outwardly from the transistor for external electrical connections. Additionally, an opening 60 (FIG. 2) is provided for insertion of a locating pin 61.

It is to be noted at this point in the description that the brackets 26 engaged with the wall member 18, as viewed in FIG. 4, are positioned oppositely and offset from the brackets 26 engaged with the wall member 20. Through the employment of the latter relationship, the necessary spacing between the wall members 18, 20 is maintained at a minimal value.

Figure 5:
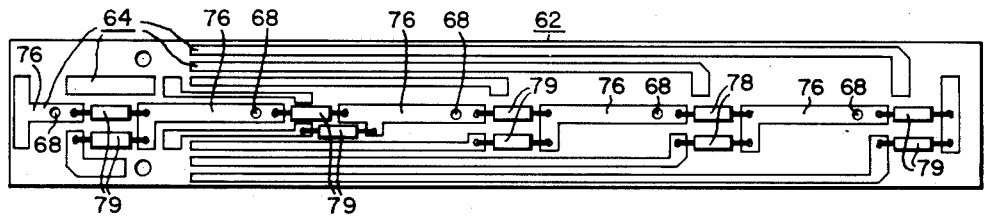
FIG. 5 is a top plan view of a printed circuit member for use in the housing of FIGS. 2, 3 and 4.

In order to provide electrically conductive paths for various connections to be made between the circuit elements of the aforementioned circuit arrangement, a member 62 is positioned in spaced relationship with the brackets 26 of each of the wall members 18, 20, respectively. Each member 62 is provided with prescribed conductive paths 64 (FIG. 5) in a manner that is well known in present technology. For descriptive purposes, it is to be noted that a member provided with conductive paths as just described is conventionally referred to as a printed circuit member.

As shown in FIGURES 2 through 5, each of the printed circuit members 62 is extended substantially the full distance of the longitudinal dimension of the wall members 18, 20. In order to support each of the printed circuit members 62 in its aforementioned spaced position, a plurality of bolts 66, for example, are extended through corresponding openings 68 of each printed circuit member 62 for engagement with the brackets 26. Thus, each bolt 66 is also passed through an opening 70 in the arm 30 of an adjacent bracket 26 for engagement with a nut 72 adjacent to the inwardly facing surface 56 of the arm 30 of that bracket 26. Additionally, a conductive tubular element or spacer 74 is positioned between the arm 30 of each of the brackets 26 and the associated printed circuit member 62 so that when the bolts 66 are engaged with the nuts 72 as just described, each of the printed circuit members 62 is then supported in a spaced relationship with the brackets 26.

Since each of the bolts 66 is positioned to be engaged with an adjacent conductive path 76 of the printed circuit members 62, an electrical path is established from the mounting portion 46 of each transistor 32 through the associated bracket 26 and bolt 66 to that conductive path 76 of the printed circuit member 62 which is engaged by the associated bolt 66. In the type of transistor that is illustrated here, a collector electrode of the transistor 32 is electrically common with the mounting portion 46 so that the electrical paths just described provide for making connections to the collector of each of the transistors 32.

Other circuit elements, such as resistors, 78, 79 can be connected with the conductive paths 64 of the printed circuit members 62 to establish the desired electrical circuit, for example one in accordance with the description set forth in the previously mentioned copending application. When the transistors 32 and the printed circuit members 62 are positioned as described with respect to the brackets 26 within the space between the wall members 18, 20, and when all of the necessary electrical connections with the printed circuit members 62 are established, the closure members 42 can be engaged with the wall members 18, 20 in the manner previously described. If desired, an elongated insulator 81 can be inserted between the oppositely positioned wall members 18, 20 to shield the oppositely faced transistors 32 from each other. As viewed in FIGURE 4, it is to be noted that each of the closure members 42, formed from a suitable material such as aluminum, is provided with a bight portion 80 and leg portions 82 to ensure electrical isolation of the closure members 42 from the circuitry enclosed within the central portion 14 of the housing 10.

From what has been set forth thus far, it follows that the wall members 18, 20 and the closure members 42 can be maintained at ground potential for safety purposes without interference with the operation of the circuitry enclosed within these members. Furthermore, any heat that is generated by the circuit elements, such as the transistors 32, forming a part of the enclosed circuitry, can be readily transmitted through a thermally conductive path formed in part by the brackets 26, each of which is serially associated with the film 34 of insulation and the wall members 18, 20. In particular, any heat generated by the transistors 32 is readily transmitted from the heat generating portion, usually the enclosed semiconductive crystal, through the mounting portion 46 and across the flushly engaged surfaces 48, 56 into the bracket 26, and then across the film 34 of insulation into the wall member 18 or 20 for dissipation through the radiating fins 40. To exemplify the significance of the arrangement illustratively described here, some statistics related to heat transfer will now be set forth.

It has been found, for example, that when the aforementioned circuit arrangement is operated at full power rating, for each watt of heat generated by a transistor 32, a thermal drop of 1° centigrade occurs between the crystal of the transistor 32 and the mounting portion 46 of the transistor 32. Another 1.3° centigrade drop occurs between the mounting portion 46 of the transistor 32 and the wall member 18 or 20, and, finally, another 1° centigrade occurs between the radiating fins 40 of the wall member and the aforementioned ambient matter.

If the crystal of the transistor 32 were to rise in temperature above a limiting upper value, damage would occur to the crystalline structure through melting or other means. Thus, it is paramount that the temperature rise of the transistor crystal be maintained below the upper prescribed value.

It has been found that the temperature gradients described above are satisfactory for the purpose of maintaining the transistors 32 at temperatures below the upper prescribed value, even during full power operation of the aforementioned circuit arrangement. It is to be noted particularly that the thermal gradient across the thermally conductive paths from the transistors 32 to the ambient matter is minimized for several reasons. In the first place, as previously described, optimal conditions for heat transfer are provided between the mounting portion 46 of the transistor 32 and the inwardly extended arm 30 of the bracket 26, particularly as a result of the large cross-sectional area provided for the thermal path at this juncture by the flushly engaged surfaces 48, 56. Additionally, because the film 34 of insulation does introduce some thermal impedance, though this factor is minimized through reducing the thickness of the film 34 of insulation, the bracket arm 28 is provided with a relatively large cross-sectional area to provide a broadened path through which heat can flow through the bracket 26 and insulative film 34 to the wall member 18 or 20.

The end portion 16 of the housing 10 is engaged with the central portion 14 of the housing 10 through the use of bolts (not shown) passed through a frame member 84 of suitable material, such as aluminum, and extended into threaded openings provided in end fins 86 of the wall members 18, 20. Circuit elements other than those previously considered, such as capacitors, switches, transformers, or inductors, being associated with the aforementioned circuit arrangement as exemplified here, can be supported in the end portion 16, particularly if the dissipation of heat is not as critical with these other elements as it is with the elements supported in the central portion 14 of the housing 10. An end plate (not shown) is engaged with the frame member 84 through the use, for example, of bolts (not shown) to enclose the elements supported in the end portion 16 and openings (not shown) can be provided in the end plate, or in the frame member 84 if desired, for passage of conductors which are to be connected with external apparatus.

The other end portion 12 is provided with a frame member 88 and an end plate 90 similar to the frame member and end plate of the end portion 16 just described, and, additionally, with a wall member 92 having radiating fins 93 and being similar in substance to the wall members 18, 20 of the central portion 14 of the housing 10 but formally differing therefrom in the matter of dimensions.

For reasons to become apparent subsequently, the wall member 92 of the end portion 12 is engaged with the wall member 18 of the central portion 14 of the housing 10 through the use of structural members 94, in this instance cylindrical in form, of limited cross-sectional area. Additionally, a plurality of L-shaped brackets 96 (FIG. 2) are engaged with the wall member 92, through the use of bolts 97 for example, in order to provide for engagement with a plurality of diode elements 98, respectively. In this instance, an insulator 100 is positioned between each of the diodes 98 and its corresponding bracket 96 so that the brackets 96 and the wall member 92 are electrically isolated from conductive portions of the diodes 98, respectively.

It is now apparent that a path for transfer of heat generated by the diodes 98 is provided from each diode 98 through the associated insulator 100 into the associated bracket 96 and into the wall member 92 for dissipation or transfer to the aforementioned ambient matter by the radiating fins 93. Since the wall member 92 of the end portion 12 is engaged with the wall member 18 of the central portion 14 through the use of the structural members 94 of limited cross-sectional area to form a relatively high thermal impedance therebetween, the thermal gradient of the heat transfer paths from the diodes 98 is substantially independent of the thermal gradient of the heat transfer paths from the transistors 32 in the central portion 14 of the housing 10.

The latter relation is significant in that the allowable temperature rise for the diodes 98, or, if desired, other circuit elements having similar thermal properties, is somewhat greater than the allowable temperature rise for the transistors 32. Thus, a flow of heat from the diodes 98 through the wall member 92, to the wall member 18 of the central portion 14 of the housing 10 is minimized to ensure operation of the transistors 32 below their prescribed upper limit of temperature.

In addition to providing support and heat dissipation for the diodes 98, the end portion 12 of the housing 10 can also provide support for other circuit elements, such as capacitors, of the aforementioned circuit arrangement. Where desired, openings 102 can be provided in the end plate 90, or in the frame member 88, for passage of conductors to be connected with external apparatus.

As an alternate arrangement for providing heat transfer from the transistors 32, conventional continuous tubing (not shown) of a material having good thermal conductivity can be engaged with the outwardly facing side 104, as viewed in FIG. 4, of the arm 30 of each of the brackets 26 to extend along the longitudinal dimension of the central portion 14 of the housing 10. Passage of a fluid through the tubing then provides for heat transfer away from the transistors 32 in a manner that offers physical results substantially equivalent to the physical results obtained through the use of the radiating fins 40 considered previously. In this alternate or modified arrangement, the thermal conductivity and the dimensional values of the member or film 34 of insulation would not be as critical as in the aforedescribed principal arrangement. Of course, additional modified arrangements will be evident to those skilled in the art of the invention.

What has been set forth is descriptive of an embodied arrangement of structural members for supporting the circuit elements of circuit arrangements in a compactly sized unit which is readily and economically assembled and which provides for transfer of heat generated by the circuit elements. The transfer of heat precludes the circuit elements from acquiring elevated temperature values beyond the values found to be acceptable, even during full power operation of the housed circuit arrangement. For the most part, aluminum is used as a structural material to provide an overall weight of reduced value for the structural arrangement and to provide suitable electrical and thermal properties.

In the foregoing description, the operative elements of the invention have been described as having certain illustrative forms, but, as previously pointed out by example, other forms can be readily employed for the operative elements of the invention. It is, therefore, desired that the embodiments of the invention described and referred to here be interpreted as being illustrative and not limitative of the invention and, accordingly, that the invention be accorded an interpretation consistent with the scope and spirit of its broad principles.

What is claimed is:

1. A housing for a circuit arrangement having at least one heat generating element, said housing comprising:
   joined thermally and electrically conductive walls forming a suitable enclosure for said circuit arrangement;
   thermally and electrically conductive supporting means for supporting said heat generating element on at least one of said walls, said supporting means providing a thermally conductive path between said heat generating element and said one wall, and said supporting means providing an electrically conductive path from said heat generating element to said circuit arrangement;
   an insulative film located between said supporting means and said one wall to allow heat flow therebetween but to impede electric current flow therebetween;
   a plurality of fin members extending outwardly from said housing, said fin members completing a thermally conductive path from said supporting means through said insulative film and said one wall to a heat absorbing medium so that heat is transferred from said heat generating element to said heat absorbing medium at a rate that prevents the temperature of said heat generating element from rising above a predetermined value.

2. A housing for a circuit arrangement having at least one heat generating element, said housing comprising:
   joined thermally and electrically conductive walls forming a suitable enclosure for said circuit arrangement;
   a conductive bracket member mounted on at least one of said walls, said bracket member supporting said heat generating element and presenting a flush mounting surface for said heat generating element suitably adapted to conduct heat and current from said heat generating element;
   an insulative film located between said bracket member and said one wall to allow heat to flow therebetween but to impede electric current flow therebetween;
   and means for transferring generated heat to a heat absorbing medium, said transferring means comprising said bracket member, said insulative film and a portion of said housing, said transferring means forming a thermally conductive path to said heat absorbing medium so that sufficient heat is transferred from said heat generating element to said heat absorbing medium to maintain the temperature of said heat generating element at a low level.

3. A housing for a circuit arrangement having at least one first heat generating element with a first rate of heat generation and at least one second heat generating element with a second rate of heat generation, said housing comprising:
   joined thermally conductive walls forming a suitable enclosure for said circuit arrangement, one of said walls having a first wall portion and a second wall portion;
   a first heat discharge means on said first wall portion of said one wall, and a second heat discharge means on said second wall portion of said one wall;
   thermal impedance means between said first wall portion and said second wall portion;
   a first support means located on said first wall portion for supporting said first heat generating element in a thermally conductive manner so that a first thermally conductive path is established between said first heat generating element and said first wall portion;
   a second support means located on said second wall portion for supporting said second heat generating element in a thermally conductive manner so that a second thermally conductive path is established between said second heat generating element and said second wall portion, whereby heat can be transferred from said first and second heat generating elements through said one wall for discharge to a heat absorbing medium so that the temperature gradient of said first thermally conductive path and the temperature gradient of said second thermally conductive path are substantially independent of one another during flow of heat from at least one of said first and said second heat generating elements.

4. A housing for a circuit arrangement having at least one first heat generating element with a first rate of heat generation and at least one second heat generating element with a second and higher rate of heat generation than said first heat generating element, said housing comprising:
   joined thermally conductive walls forming a suitable enclosure for said circuit arrangement, one of said walls having a first wall portion and a second wall portion;
   a first heat discharge means on said first wall portion of said one wall, and a second heat discharge means on said second wall portion of said one wall;
   at least one structural member of reduced cross-sectional area joining said first wall portion and said second wall portion for impeding heat flow therebetween;
   a first support means located on said first wall portion for supporting said first heat generating element in a thermally conductive manner so that a first thermally conductive path is established between said first heat generating element and said first wall portion;
   a second support means located on said second wall portion for supporting said second heat generating element in a thermally conductive manner so that a second thermally conductive path is established between said second heat generating element and said second wall portion, whereby heat can be transferred from said first and said second heat generating elements through said one wall for discharge to a heat absorbing medium so that the temperature gradient of said first thermally conductive path and the temperature gradient of said second thermally conductive path are substantially independent of one another during flow of heat from at least one of said first and said second heat generating elements.

5. A housing for a circuit arrangement having circuit elements and at least one heat generating element, said heat generating element mounted within said housing but thermally separate from said circuit elements, said housing comprising:
   joined thermally and electrically conductive walls forming a suitable enclosure for said circuit elements and said heat generating element;
   an insulative support member mounted within said housing for supporting said circuit elements; a conductive bracket member for supporting said heat generating element, said bracket mounted within said housing against at least one of said walls;
   an insulative film located between said conductive bracket and said one wall for allowing heat flow therebetween and impeding electric current flow therebetween;
   heat transferring means located on said housing for transferring heat from said housing to a heat absorbing medium, whereby the heat generated by said heat generating element is transferred therefrom through said conductive bracket, through said insulative film, through said housing and said heat transferring means and into said heat absorbing medium.

6. A housing for a circuit arrangement having circuit elements and at least one heat generating element, said heat generating element mounted within said housing but thermally separate from said circuit elements, said housing comprising:
  joined thermally and electrically conductive walls forming a suitable enclosure for said circuit elements and said heat generating element;
  an insulative support member mounted within said housing for supporting said circuit elements;
  a conductive bracket member for supporting said heat generating element, said bracket mounted within said housing against at least one of said walls;
  an insulative film located between said conductive bracket and said wall for allowing heat flow therebetween and impeding electric current flow therebetween;
  a plurality of fin members extending outwardly from said housing for transferring heat from said housing to a heat absorbing medium, whereby the heat generated by said heat generating element is transferred therefrom through said conductive bracket, through said insulative film, through said housing and said plurality of fin members and into said heat absorbing medium.

References Cited by the Examiner

UNITED STATES PATENTS

| | | | |
|---|---|---|---|
| 2,383,735 | 8/45 | Ray | 317—100 X |
| 2,542,853 | 2/51 | Wills | 317—120 |
| 2,772,382 | 11/56 | Escoffery | 317—100 X |
| 2,815,472 | 12/57 | Jackson | 317—100 |
| 2,833,966 | 5/58 | Goodier | 317—100 |
| 2,849,661 | 8/58 | Oleson | 317—100 X |
| 2,881,364 | 4/59 | Demer et al. | 317—100 |
| 2,903,626 | 9/59 | Nye | 317—101 |
| 2,912,624 | 11/59 | Wagner | 317—100 |
| 2,935,666 | 5/60 | Van Namen | 165—185 |
| 2,958,515 | 11/60 | Booker | 165—80 |
| 2,974,263 | 3/61 | Akins | 317—100 |
| 2,986,679 | 5/61 | Storstand | 317—100 |
| 2,999,971 | 9/61 | Schnecke | 317—100 |
| 3,011,105 | 11/61 | Le Blanc | 317—100 |

JOHN F. BURNS, *Primary Examiner.*

SAMUEL BERNSTEIN, E. JAMES SAX, *Examiners.*